(12) United States Patent
Tanigawa et al.

(10) Patent No.: US 9,428,048 B2
(45) Date of Patent: Aug. 30, 2016

(54) WORK VEHICLE WITH IMPROVED FUEL TANK MOUNTING

(71) Applicant: KUBOTA CORPORATION, Osaka (JP)

(72) Inventors: Takuya Tanigawa, Osaka (JP); Daisuke Yasunobe, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 14/855,745

(22) Filed: Sep. 16, 2015

(65) Prior Publication Data

US 2016/0089974 A1 Mar. 31, 2016

(30) Foreign Application Priority Data

Sep. 26, 2014 (JP) ................. 2014-197174

(51) Int. Cl.
| | |
|---|---|
| *B60K 15/063* | (2006.01) |
| *B60K 15/067* | (2006.01) |
| *B62D 49/00* | (2006.01) |
| *B62D 33/06* | (2006.01) |
| *B60K 15/03* | (2006.01) |
| *B62D 33/10* | (2006.01) |

(52) U.S. Cl.
CPC ............. *B60K 15/063* (2013.01); *B60K 15/03* (2013.01); *B60K 15/067* (2013.01); *B62D 33/0617* (2013.01); *B62D 33/10* (2013.01); *B62D 49/00* (2013.01); *B60K 2015/0634* (2013.01)

(58) Field of Classification Search
CPC .................... B60K 15/063; B60K 15/0634
See application file for complete search history.

(56) References Cited

FOREIGN PATENT DOCUMENTS

JP 2013-194568 9/2013

*Primary Examiner* — Kevin Hurley
(74) *Attorney, Agent, or Firm* — Greenblum & Bernstein, P.L.C.

(57) ABSTRACT

The present invention includes a vehicle body frame. A cabin is mounted to the vehicle body frame so as to be isolated from vibration. A fuel tank is located below the cabin. The vehicle body frame includes a bracket extending laterally outward in a cantilever from at least one of a left side and a right side. The bracket includes: a cabin support portion carrying and supporting one front-back direction side of the cabin from below via a vibration isolation member; and a tank support portion supporting one front-back direction side of the fuel tank. The tank support portion is arranged at a position further toward an extended end than the cabin support portion of the bracket.

18 Claims, 7 Drawing Sheets

WORK VEHICLE WITH IMPROVED FUEL TANK MOUNTING

CROSS-REFERENCE TO RELATED APPLICATIONS

The present application claims priority under 35 U.S.C. §119 of Japanese Application No. 2014-197174, filed on Sep. 26, 2014, the disclosure of which is expressly incorporated by reference herein in its entirety.

BACKGROUND OF THE INVENTION

1. Field of the Invention

The present invention relates to a work vehicle that includes a vehicle body frame, a cabin mounted to the vehicle body frame so as to be isolated from vibration, and a fuel tank provided below the cabin.

2. Description of Related Art

A tractor (exemplary work vehicle) may be configured such that a fuel tank is supported on a traveling vehicle body via a forward support bracket provided at a location on the forward side of the fuel tank and a rearward support bracket provided at a location on the rearward side of the fuel tank (see, e.g., Japanese Patent Laid-open Publication No. 2013-194568, paragraph number 0025 and FIGS. 1 to 3).

In the above-described configuration, in a case where the cabin, which is mounted so as to be isolated from vibration, is swung left and right with respect to the traveling vehicle body due to vibration during travel over poor roads or the like, a bottom of the cabin may make contact with the fuel tank. In order to avoid such contact, spacing between the bottom of the cabin and the fuel tank could be increased. However, in such a case, a vertical length of the fuel tank is significantly limited and is shortened, which may reduce capacity in the fuel tank.

SUMMARY OF THE INVENTION

The present invention enables contact between the cabin and the fuel tank due to vibration during travel over poor roads or the like to be avoided while inhibiting a reduction of the capacity of the fuel tank.

In order to resolve the above-noted issue, one aspect of the present invention includes: a vehicle body frame; a cabin mounted to the vehicle body frame so as to be isolated from vibration; and a fuel tank provided below the cabin. The vehicle body frame includes a bracket extending laterally outward in a cantilever from at least one of a left side and a right side. The bracket includes: a cabin support portion carrying and supporting one front-back direction side of the cabin from below via a vibration isolation member; and a tank support portion supporting one front-back direction side of the fuel tank. The tank support portion is arranged at a position further toward an extended end than the cabin support portion of the bracket.

According to this aspect, in a case where the cabin, which is mounted so as to be isolated from vibration, tilts to the left and right with respect to the vehicle body frame due to vibration during travel over poor roads or the like, the bracket and the fuel tank receive the load of the tilting cabin and tilt to the left and right to a substantially similar degree as the cabin. Accordingly, even when a vertical length of the fuel tank is increased and an interval between the bottom of the cabin and the fuel tank is decreased, a risk of the bottom of the cabin making contact with the fuel tank can be avoided.

As a result, contact between the cabin and the fuel tank due to vibration during travel over poor roads or the like can be avoided while inhibiting a decrease in the capacity of the fuel tank.

According to another aspect of the present invention, the vehicle body frame includes a tank support member supporting a second front-back direction side of the fuel tank. The fuel tank includes a first coupler arranged on and coupling the tank support portion; and a second coupler arranged on and coupling the tank support member.

According to this aspect, in a case where the fuel tank is mounted on a work vehicle, the first coupler is arranged on the tank support portion of the bracket and the second coupler is arranged on the tank support member, thereby enabling the fuel tank to be provisionally placed spanning between the bracket of the vehicle body frame and the tank support member. Thereafter, the first coupler is coupled to the tank support portion of the bracket and the second coupler is coupled to the tank support member, thereby enabling the fuel tank to be mounted on the work vehicle.

In other words, a task of mounting the fuel tank on the work vehicle can be readily performed by a single person.

According to another aspect of the present invention, a protective cover is provided protecting a bottom and lateral exterior portion of the fuel tank.

According to this aspect, a risk of the bottom or lateral exterior portion of the fuel tank contacting other objects during travel and being damaged can be effectively inhibited.

According to another aspect of the present invention, a fixating band is provided fixating the fuel tank in a state where the fuel tank rests atop the protective cover, and the first coupler is provided to the fuel tank via the fixating band.

According to this aspect, the configuration of the fuel tank can be simplified as compared with a case where the first coupler is directly mounted on the fuel tank. In addition, a load dictated by supporting the fuel tank is less likely to be borne by the fuel tank.

Accordingly, durability of the fuel tank can be enhanced while simplifying the fuel tank configuration.

According to another aspect of the present invention, the second coupler is configured by a bottom surface portion on the second front-back direction side of the protective cover.

According to this aspect, the configuration of the fuel tank can be simplified as compared with a case where the second coupler is directly mounted on the fuel tank. In addition, a load dictated by supporting the fuel tank is less likely to be borne by the fuel tank.

Accordingly, durability of the fuel tank can be enhanced while simplifying the fuel tank configuration.

According to another aspect of the present invention, a front end of the fuel tank extends upward forward of the cabin, and a fuel supply opening is formed on a top surface of the front end.

According to this aspect, the front end of the fuel tank is unlikely to more readily make contact with other objects during travel. Instead, by increasing the size of the front end, the capacity of the fuel tank can be increased, and fuel supply to the fuel tank, which is positioned below the cabin, can be facilitated.

According to another aspect of the present invention, the front end of the fuel tank is formed so as to be wide, flaring laterally outward of the cabin, and a lateral exterior end thereof is positioned more toward a vehicle interior than a lateral exterior end of an assistance step provided to the cabin for entering and leaving the vehicle.

According to this aspect, the front end of the fuel tank is inhibited from making contact with other objects during travel, while the capacity of the fuel tank can be increased by increasing the size of the front end.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an embodiment applying the present invention to a tractor, as an example of a work vehicle, is described with reference to the drawings as an exemplary embodiment of the present invention.

Figure 1:
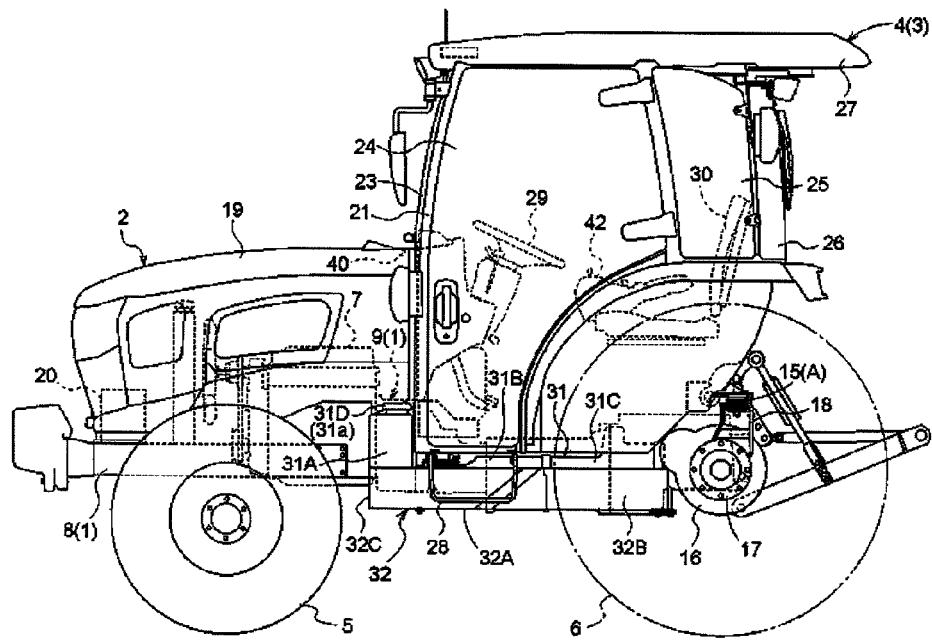
FIG. 1 is a left side view of a tractor.

As shown in FIG. 1, an exemplary tractor in the present embodiment includes a motor portion 2 in a front half of a vehicle body frame 1. In addition, a cabin 4 forming a cockpit 3 is mounted so as to be isolated from vibration in a rear half of the vehicle body frame 1. Furthermore, left and right front wheels 5 capable of being driven and steered are provided to locations on both left and right sides of a front portion of the vehicle body frame 1. In addition, left and right rear wheels 6 capable of being driven and braked are provided to locations on both left and right sides of a rear portion of the vehicle body frame 1. Accordingly, a four-wheel drive format that includes the drivable left and right front wheels 5 and left and right rear wheels 6 is achieved.

Figure 2:
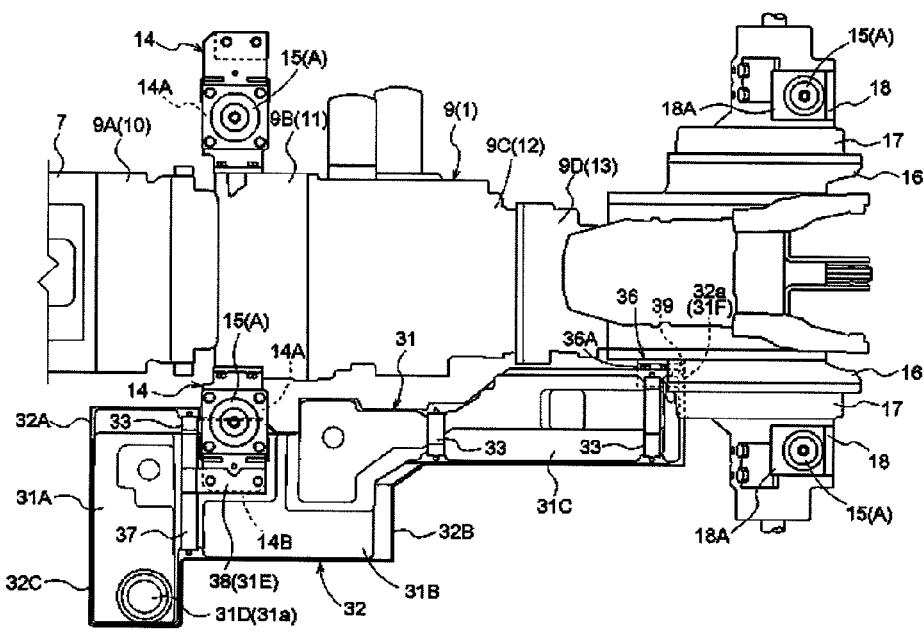
FIG. 2 is a plan view of relevant portions showing a support structure of a fuel tank.
Figure 3:
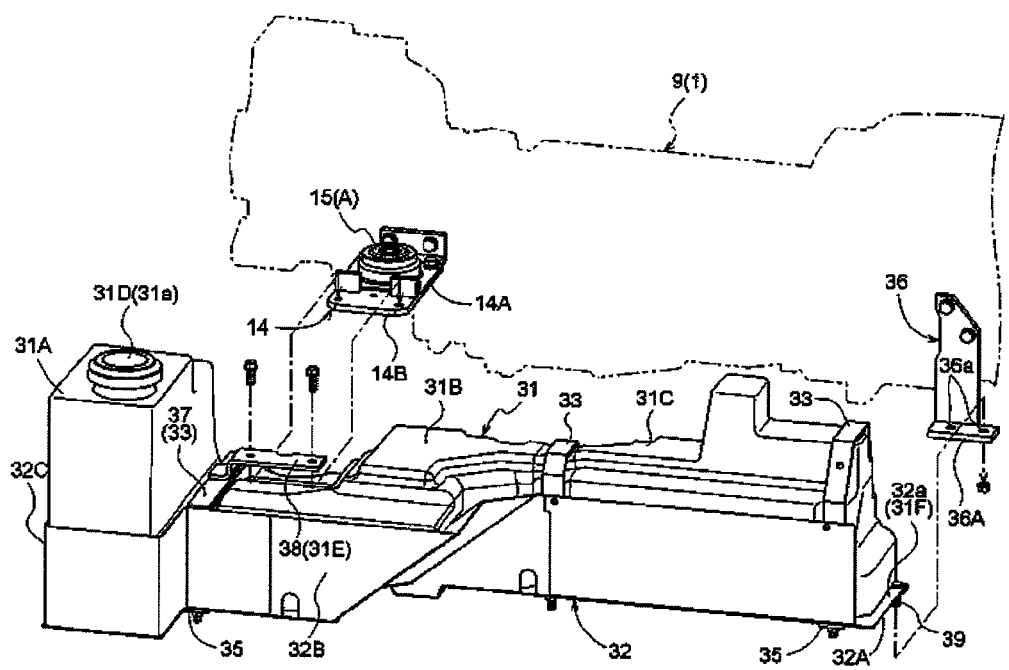
FIG. 3 is an exploded perspective view of relevant portions showing the support structure of the fuel tank.
Figure 4:
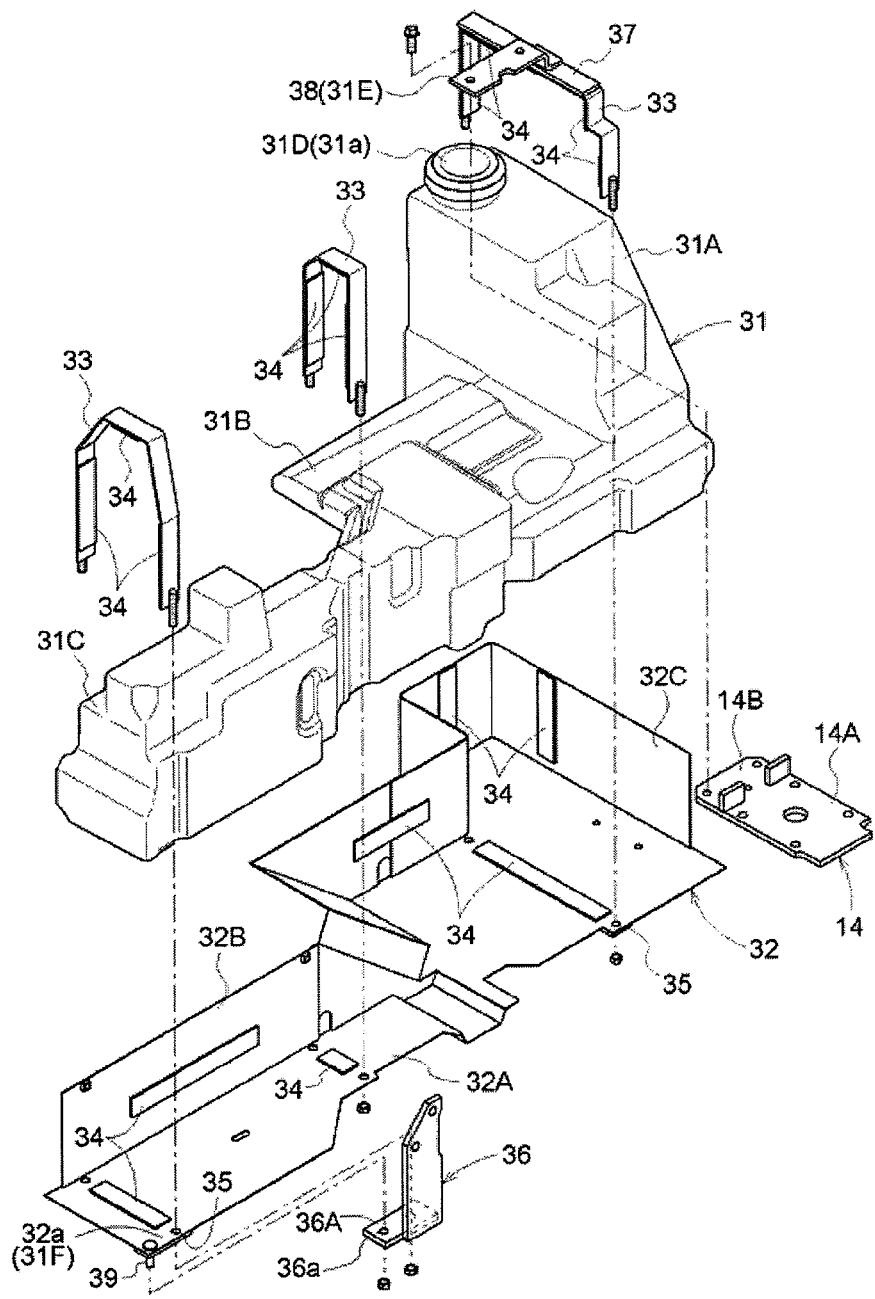
FIG. 4 is an exploded perspective view of relevant portions showing a structure connecting the fuel tank to a protective cover, and showing the support structure of the fuel tank.

As shown in FIGS. 1 to 3, the vehicle body frame 1 is configured by bolting together an engine 7; a front frame 8 extending forward from below the engine 7; and a frame member/housing unit 9 extending rearward from below a rear end of the engine 7. In other words, the front half of the vehicle body frame 1 is configured by the engine 7 and the front frame 8, while the rear half of the vehicle body frame 1 is configured by the housing unit 9.

The housing unit 9 is configured by detachably bolting together, in order in a front-back direction, a fly wheel housing 10 as a first housing 9A; a clutch housing 11 as a second housing 9B; a midcase 12 as a third housing 9C; and a rear case 13 as a fourth housing 9D. A front end of the fly wheel housing 10 is bolted to a rear end bottom portion of the engine 7, and the fly wheel housing 10 is connected to a rear portion of the engine 7. Thereby, the fly wheel housing 10 is positioned forward of the cabin 4, and the clutch housing 11, midcase 12, and rear case 13 are positioned below the cabin 4.

A top portion of the clutch housing 11 inclines upward as it approaches the front, toward the fly wheel housing 10. The clutch housing 11 further includes left and right brackets 14 extending laterally outward in a cantilever from both left and right sides of the clutch housing 11. The left and right brackets 14 include a cabin support portion 14A carrying and supporting a front end of the cabin 4 from below via a rubber mount 15 as a vibration isolation member A.

The rear case 13 includes left and right brake cases 16 connected to both left and right sides of the rear case 13, and left and right rear axle cases 17 extending laterally outward in a cantilever from both left and right brake cases 16. The left and right rear axle cases 17 each include a support member 18 standing upright on a brake case-side of the rear axle case. A top end of each of the left and right support members 18 is configured as a cabin support portion 18A carrying and supporting a rear end of the cabin 4 from below via the rubber mount 15 as the vibration isolation member A.

As shown in FIG. 1, the motor portion 2 is configured by providing the engine 7, battery 20, and the like in the engine compartment, which is formed by the front frame 8, the hood 19, and the like.

Figure 5:
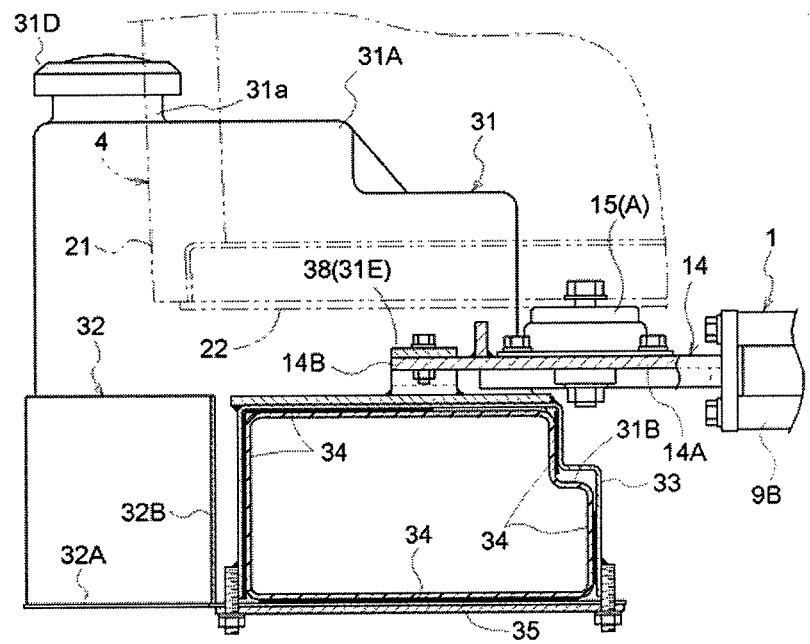
FIG. 5 is a rear, vertical cross-section view of relevant portions showing the support structure for a front portion of the fuel tank.
Figure 6:
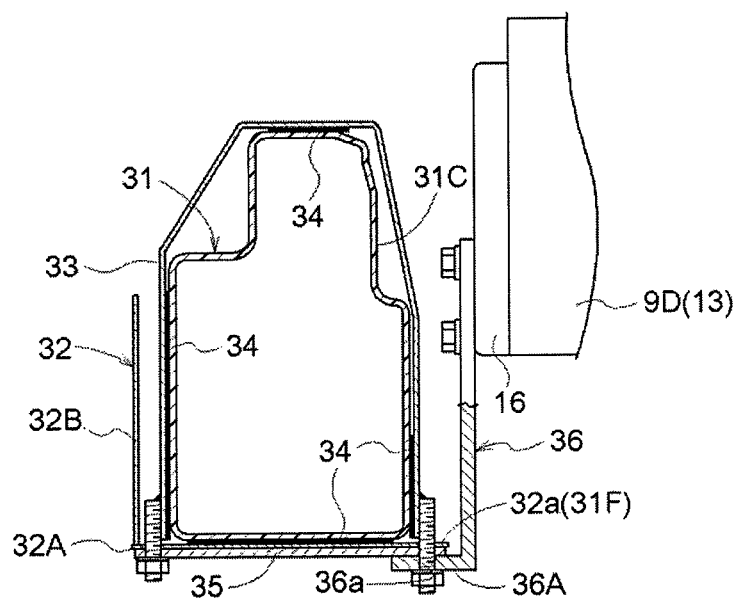
FIG. 6 is a rear, vertical cross-section view of relevant portions showing the support structure for a rear portion of the fuel tank.
Figure 7A:
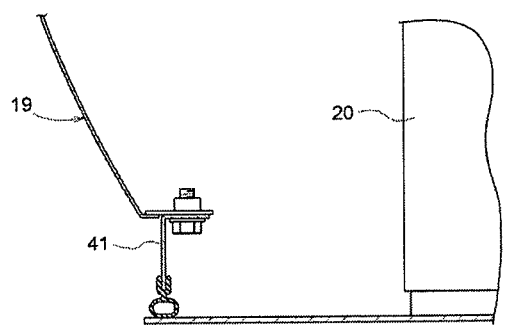
FIG. 7A is a front, vertical cross-section view of relevant portions showing a configuration of a hood for a high horsepower model.
Figure 7B:
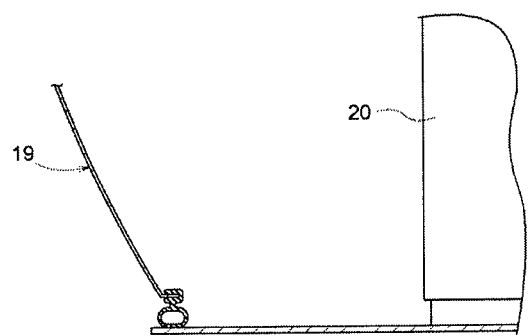
FIG. 7B is a front, vertical cross-section view of relevant portions showing a configuration of a hood for a low horsepower model.
Figure 8:
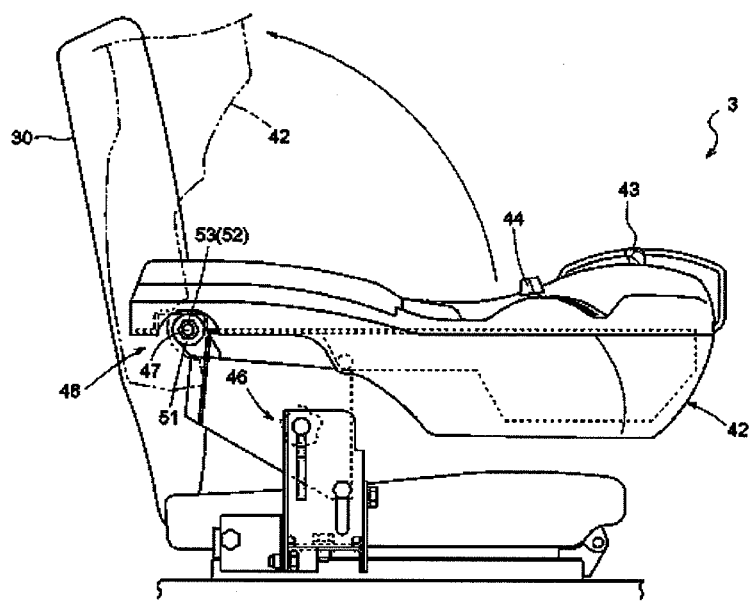
FIG. 8 is a right side view of relevant portions showing a configuration of an armrest.
Figure 9:
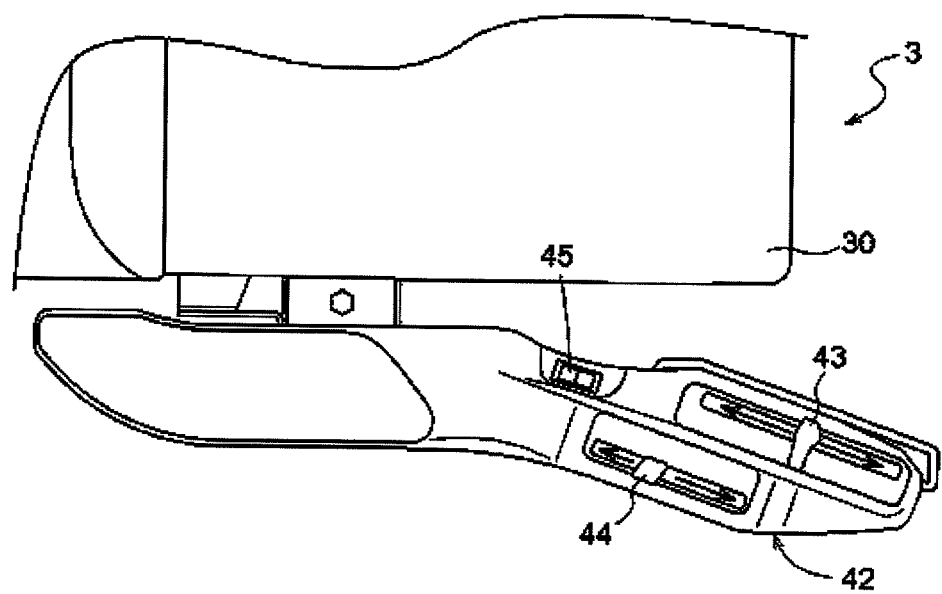
FIG. 9 is a plan view of some relevant portions of the armrest.

As shown in FIGS. 1 and 5, the cabin 4 is configured to include, on a cabin frame 21, a floor panel 22 forming a floor surface; a transparent windshield 23; transparent, outward-opening left and right door panels 24; transparent, outward-opening left and right side windows 25; a transparent, outward-opening rear window 26; a roof 27 having a storage space; and left and right assistance steps 28 for entering and leaving the vehicle. In addition, a steering wheel 29 for front wheel steering, a driver's seat 30, and the like are included on an interior of the cabin 4 to form the cockpit 3. An air conditioning unit (not shown in the drawings) or the like is installed in the roof 27.

As shown in FIGS. 1 to 6, a fuel tank 31 that can be made of resin is provided to a location on a left side of the vehicle body frame 1, and below the cabin 4. The fuel tank 31 includes a front end 31A extending forward of the cabin 4; a middle portion 31B positioned forward of the left rear wheel 6, and below the cabin 4; and a rear portion 31C adjacent to an inner surface of the left rear wheel 6, and below the cabin 4. In addition, a left-right direction width of the rear portion 31C is limited so as to fit between the vehicle body frame 1 and the left rear wheel 6, whereas the left-right direction width of the middle portion 31B is expanded such that a left end position of the middle portion 31B is identical (or nearly so) to that of the cabin 4. Moreover, the front end 31A is formed so as to be wide, flaring outward to the left of the cabin 4, and a left end (lateral exterior end) thereof is positioned more toward a vehicle interior than a left end (lateral exterior end) of the left assistance step 28. In addition, the front end 31A is formed so as to extend upward forward of the cabin 4. Also, a fuel supply opening 31a, which includes a cap 31D, is arranged on a top surface of the front end 31A. Accordingly, while a capacity of the fuel tank 31 is increased with this arrangement, a risk of the fuel tank 31 contacting other objects is inhibited and fuel supply to the fuel tank 31 provided below the cabin 4 is facilitated or made possible.

The fuel tank 31 includes a protective cover 32 made of sheet metal, which protects a bottom and left side (lateral exterior portion) of the fuel tank 31, for example. The protective cover 32 includes a bottom panel 32A covering the bottom of the fuel tank 31 from below; a side panel 32B covering the left side of the fuel tank 31 from the left exterior; and a front panel 32C covering the front end 31 A of the fuel tank 31 from the front. In addition, using three screw-fixation fixating bands 33, the fuel tank 31 is fixed to the protective cover 32 in a state where the fuel tank 31 rests atop the bottom panel 32A of the protective cover 32. The protective cover 32 and each of the fixating bands 33 include a plurality of vibration isolation rubber plates or members 34 interposed between the fuel tank 31 and the respective component. Furthermore, the protective cover 32 has reinforcement members 35 welded to the location where the fuel tank 31 is fixated by the fixating bands 33 on both front and back ends.

The vehicle body frame 1 provides a tank support portion 14B to the left bracket 14. The left and right brackets 14 support the cabin 4, with the tank support portion 14B supporting a front portion of the fuel tank 31. In addition, a tank support member 36 supporting a rear portion of the fuel tank 31 is provided to the left side portion of the rear case 13. The tank support portion 14B is arranged at a left end position further toward an extended end than the cabin support portion 14A on the left bracket 14. The tank support member 36 is jointly coupled, together with the left brake case 16, to the rear case 13. In addition, a support portion 36A carrying and supporting the fuel tank 31 and the protective cover 32 from below is provided to a bottom end of the tank support member 36. The support portion 36A includes two bolt insertion holes 36a for use with the fixating bands and for tank fixation.

The fuel tank 31 includes a first coupler 31E arranged on and coupling the tank support portion 14B of the left bracket 14 with a bolt; and a second coupler 31F arranged on and coupling the support portion 36A of the tank support member 36 with a bolt. The first coupler 31E is configured by a coupling member 38 oriented in the front-back direction and welded together with the reinforcement member 37 onto the top end of the frontmost fixating band 33 fixating the front portion of the fuel tank 31 to the protective cover 32. In other words, the first coupler 31E is provided to the fuel tank 31 via the frontmost fixating band 33. In addition, the first coupler 31E is configured so as to be capable of bolt fixation with the tank support portion 14B of the left bracket 14. The second coupler 31F is configured by a bottom surface portion 32a on a rear right end of the protective cover 32. In addition, the second coupler 31F is configured such that the rear reinforcement member 35 is positioned on the bottom surface portion 32a. Also, a bolt 39, which enables bolt connection to the support portion 36A of the tank support member 36, is welded in a suspended posture.

According to the above-described configuration, in a case where the fuel tank 31 is mounted on the tractor, the fuel tank 31 is fixated to the protective cover 32 using three fixating bands 33, after which the bolt 39 of the second coupler 31F is inserted through the bolt insertion hole 36a for tank fixation on the support portion 36A of the tank support member 36, and the second coupler 31F is arranged on the support portion 36A of the tank support member 36 while the first coupler 31E is arranged on the tank support portion 14B of the left bracket 14. This enables the fuel tank 31 to be provisionally placed on the protective cover 32 and spanning between the left bracket 14 of the vehicle body frame 1 and the tank support member 36. Thereafter, the first coupler 31E is coupled to the tank support portion 14B of the left bracket 14 with a bolt and the second coupler 31F is coupled to the support portion 36A of the tank support member 36 with a bolt. Accordingly, the fuel tank 31 can be mounted on the tractor together with the protective cover 32. In other words, a task of mounting the fuel tank 31 on the tractor can be readily performed by a single person.

In addition, in a case where the cabin 4, which is mounted so as to be isolated from vibration, is tilted to the left with respect to the vehicle body frame 1 due to vibration during travel over poor roads or the like, the fuel tank 31 and the protective cover 32 tilt to the left to a substantially similar degree as the cabin 4 accompanying the left bracket 14 receiving the load of the tilting cabin 4 and lowering to the left. Accordingly, even when a vertical length of the fuel tank 31 is increased and an interval between the bottom of the cabin 4 and the fuel tank 31 is decreased, a risk of the bottom of the cabin 4 making contact with the fuel tank 31 can be avoided. As a result, contact between the cabin 4 and the fuel tank 31 due to vibration during travel over poor roads or the like can be avoided while inhibiting a decrease in the capacity of the fuel tank 31.

As shown in FIGS. 1 to 7, the hood 19 is configured so as to swing vertically about a support shaft 40 as a pivot point, the support shaft 40 being oriented in the left-right direction and provided to a top portion of the rear end of the motor portion 2, the entire hood 19 swinging between a closed position covering the engine 7, the battery 20, and the like, and an open position exposing the engine 7, the battery 20, and the like. In addition, by providing a height adjustment spacer 41 (see FIG. 7A) so as to be attachable and detachable, the configuration can utilize both a high horsepower model, which increases the height, and a low horsepower model, which decreases the height. Furthermore, according to this configuration, in the high horsepower model, the entire hood 19, including the spacer 41, is configured to swing vertically between the closed position and the open position. As a result, it is possible to avoid inconvenience due to the spacer 41 interfering when cleaning the engine compartment, changing the battery 20, or the like, as might occur in a case where the spacer 41 is provided fixated to the vehicle body frame 1.

As shown in FIGS. 1 and 8 to 10, the driver's seat 30 includes an armrest 42 on the right side thereof. The armrest 42 includes a speed change lever 43, and an elevating lever 44 and elevating switch 45 for the work apparatus coupled to the rear of the tractor so as to be capable of lifting and lowering. In addition, the driver's seat 30 is configured such that the height of the armrest can be adjusted using a height adjusting mechanism 46, and such that it is capable of a vertical swing operation between a use position and a retracted position, pivoting around a support shaft 47 oriented in the left-right direction. In addition, a friction-type retention mechanism 48 is provided enabling the armrest 42 to hold its position in one of the use position and the retracted position.

Figure 10:
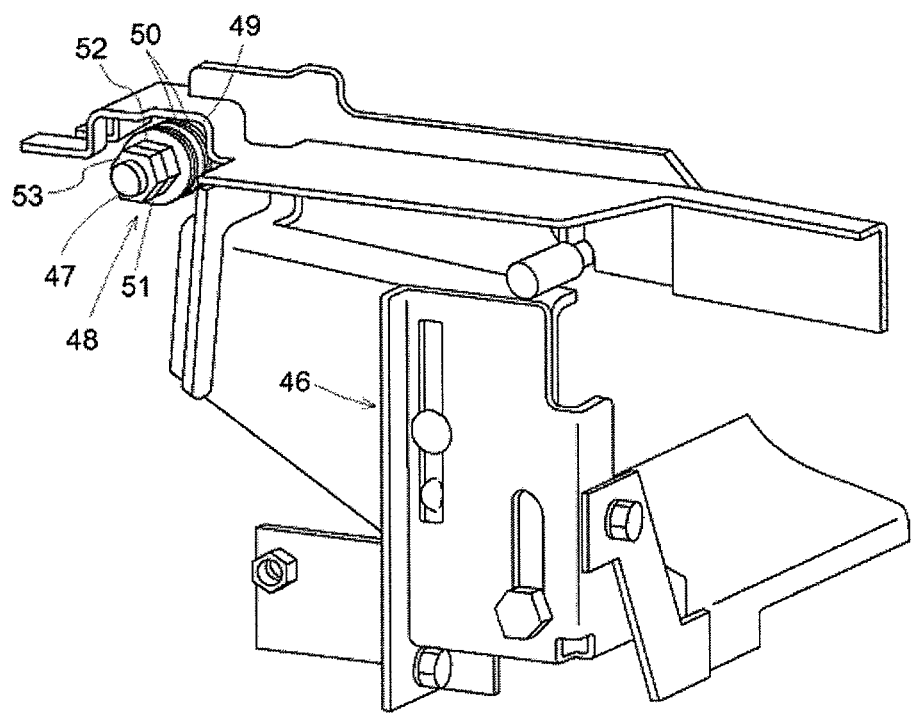
FIG. 10 is a perspective view of some relevant portions of the armrest.

As shown in FIG. 10, the retention mechanism 48 includes a friction plate 49, plate spring 50, and metal washer 51 fitted around the exterior of the support shaft 47, as well as two nuts 52 and 53 threaded onto the support shaft 47. In addition, by threading on the first nut 52, pressure is applied to the friction plate 49 via the plate spring 50 and the metal washer 51, and the friction plate 49 is pressed into contact with a boss (not shown in the drawings) of the armrest 42 fitted around the exterior of the support shaft 47, after which the second nut 53 is threaded on and the two nuts 52 and 53 are baffled. Accordingly, a friction retention state of the armrest 42 due to an appropriate fastening torque can be maintained.

Other Embodiments (1) The fuel tank 31 may be made of sheet metal or the like. Alternatively, a configuration is possible in which the fuel tank 31 is provided to the left and right of the vehicle body frame 1. In this configuration, the left and right brackets 14 each include the tank support portion 14B.

(2) A configuration is possible in which the brackets 14 supporting the cabin 4 are provided to the front and back of the vehicle body frame 1, and both front and back sides of the fuel tank 31 are supported by the front and back brackets 14.

(3) One or both of the first coupler 31E and the second coupler 31F may be directly mounted to the fuel tank 31. Also, the second coupler 31F may be provided to the fuel tank 31 via a fixating band 33.

(4) The protective cover 32 may be configured so as to protect one or both of the bottom and lateral exterior of the fuel tank 31.

(5) A compression spring or the like may be used as the vibration isolation member A.

The present invention can be applied to a work vehicle or the like, such as a tractor or a multipurpose work vehicle that includes a vehicle body frame, a cabin mounted to the vehicle body frame so as to be isolated from vibration, and a fuel tank provided below the cabin.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A work vehicle comprising:
   a vehicle body frame;
   a cabin mounted to the vehicle body frame so as to be isolated from vibration;
   a fuel tank located at least partially below the cabin,
   a bracket extending laterally outward in cantilever from at least one of a left side and a right side; and
   the bracket comprises:
      a cabin support portion carrying and supporting one front-back direction side of the cabin from below via a vibration isolation member; and
      a tank support portion supporting one front-back direction side of the fuel tank.

2. The work vehicle according to claim 1, wherein the tank support portion is laterally spaced from the cabin support portion of the bracket.

3. The work vehicle according to claim 1, wherein the vehicle body frame comprises a tank support member supporting a second front-back direction side of the fuel tank.

4. The work vehicle according to claim 3, wherein each of:
   a first coupler connects a first portion of the fuel tank to the tank support portion; and
   a second coupler connects a second portion of the fuel tank to the tank support member.

5. The work vehicle according to claim 1, further comprising a protective cover protecting a bottom and a lateral exterior portion of the fuel tank.

6. The work vehicle according to claim 1, further comprising at least one fixating band configured to fix the fuel tank to protective cover.

7. The work vehicle according to claim 6, further comprising a coupled mounted to the at least one fixating band.

8. The work vehicle according to claim 1, further comprising a fuel tank protective cover and a coupler configured to connect the fuel tank protective cover to a portion of the vehicle body frame.

9. The work vehicle according to claim 1, further comprising a fuel tank protective cover and a coupler configured to connect a portion of the fuel tank protective cover to a portion of a transmission case.

10. The work vehicle according to claim 1, wherein a front end portion of the fuel tank extends upward and forward of a lower end of the cabin and a fuel supply opening is located on the front end portion.

11. The work vehicle according to claim 1, wherein a front end portion of the fuel tank has a larger width than a middle portion or a rear portion.

12. The work vehicle according to claim 1, wherein a front end portion of the fuel tank has a lateral exterior side that extends laterally outwardly more than a lateral side of the cabin.

13. The work vehicle according to claim 1, wherein a front end portion of the fuel tank has a lateral interior side that extends laterally inwardly more than a lateral exterior end of an assistance step allowing a driver to enter and exit the cabin.

14. A work vehicle comprising:
   a vehicle body frame;
   a cabin mounted to the vehicle body frame so as to be isolated from vibration;
   a fuel tank comprising:
      a first portion located at least partially below the cabin; and
      a second portion located more forward than a front of the cabin; and a bracket arrangement comprising:
- a cabin support portion supporting from below a lateral underside of the cabin; and
- a fuel tank support portion supporting from above a front portion of the second portion of the fuel tank.

15. The work vehicle according to claim 14, wherein the tank support portion is laterally spaced from the cabin support portion.

16. A work vehicle comprising:
a vehicle body frame;
a cabin mounted to the vehicle body frame so as to be isolated from vibration;
a fuel tank comprising:
- a first portion located at least partially below the cabin; and
- a second portion located more forward than a front of the cabin; and a bracket arrangement comprising:
- a portion coupled to a lateral side of either the vehicle body frame or a transmission case;
- a cabin support portion supporting from below a lateral underside of the cabin; and
- a fuel tank support portion arranged to support the second portion of the fuel tank, wherein the bracket arrangement allows tilting movement of the cabin and comparable movement of the fuel tank when the work vehicle moves over uneven terrain.

17. The work vehicle according to claim 16, further comprising a protective cover protecting a bottom and a lateral exterior portion of the fuel tank.

18. The work vehicle according to claim 17, further comprising a bracket coupled to the protective cover and supporting from below a rear portion of the second portion of the fuel tank.

* * * * *